US008814182B1

(12) United States Patent
Kirby

(10) Patent No.: US 8,814,182 B1
(45) Date of Patent: Aug. 26, 2014

(54) COMBINATION WALKER AND TRANSPORT CHAIR WITH REMOVABLE UTILITY TRAY

(71) Applicant: Avery Kirby, Block Island, RI (US)

(72) Inventor: Avery Kirby, Block Island, RI (US)

( * ) Notice: Subject to any disclaimer, the term of this patent is extended or adjusted under 35 U.S.C. 154(b) by 0 days.

(21) Appl. No.: 13/815,255

(22) Filed: Feb. 15, 2013

(51) Int. Cl.

| | |
|---|---|
| ***A61H 3/04*** | (2006.01) |
| ***B62B 3/02*** | (2006.01) |
| ***B62B 5/00*** | (2006.01) |

(52) U.S. Cl.
CPC .... *B62B 5/00* (2013.01); *B62B 3/02* (2013.01)
USPC ............ 280/47.35; 135/66; 135/67; 224/407; 224/533

(58) Field of Classification Search
USPC ......... 224/273, 407, 409, 411, 484, 492, 533, 224/536, 537, 545; 135/65, 66, 67; 108/44, 108/88
See application file for complete search history.

(56) References Cited

U.S. PATENT DOCUMENTS 4,830,243 A * 5/1989 Mann ............................ 224/407
6,659,478 B2 12/2003 Hallgrimsson et al.
7,219,906 B2 * 5/2007 Hallgrimsson et al. .. 280/87.041
8,245,719 B2 * 8/2012 Kirby .............................. 135/66
2008/0141911 A1 6/2008 McKenna
2009/0120479 A1 5/2009 McCarthy

OTHER PUBLICATIONS

D-Lite, Aluminum Rollator, 8" Casters with LoopLocks and Tool-Free Removable Wheels, Drive Medical, Product Cat.

Dolomite Legacy Valor, 4 pages, Operating Instructions, Invacare Dolomite AB.

* cited by examiner

*Primary Examiner* — Jeffrey J Restifo
*Assistant Examiner* — Erez Gurari
(74) *Attorney, Agent, or Firm* — Peter Saxon

(57) ABSTRACT

A wheeled walker with a removable utility tray has a frame, front and rear wheels, a pivotable seat, height-adjustable handlebars, push handles, a back rest, brake handles and cables to arrest the walker, a pair of crossbars supporting the frame and a detachable utility tray with a lip to engage the top crossbar, front and side walls, a pair of tray supports extending from the bottom of the tray base down and to the rear and terminating at the bottom crossbar, the lower ends of the supports having a locking groove for engaging the bottom crossbar and a pair of horizontal braces between the tray supports.

3 Claims, 5 Drawing Sheets

COMBINATION WALKER AND TRANSPORT CHAIR WITH REMOVABLE UTILITY TRAY

BACKGROUND OF THE INVENTION

This invention relates to a wheeled walker and transport chair with a removable utility tray.

Wheeled walkers are sometimes equipped with a seating surface that permits the user to rest in the sitting position. A typical walker that is readily converted for use as a transport chair is disclosed in U.S. Pat. No. 6,659,478. Such combined walker/transport chair is commercially available as in, for example, the Dolomite LEGACY VALOR™ walker sold by INVACARE DOLOMITE AB of Sweden. However, such a walker lacks an easily removable utility tray for carrying books, open beverage containers, canes and umbrellas. Another four wheel rollator with a foldable transport chair is available from Drive Medical as the D-Lite™ Aluminum Rollator 750NB having a metal basket detachably removable from the walker frame, but lacking provision for carrying heavy objects, a cane, umbrella or open beverage container. To maximize the flexibility of a four wheel rollator it is desirable to provide a readily mountable-demountable utility tray to allow an impaired person with limited dexterity to also transport large objects, as canes, umbrellas, open containers, books and the like easily and safely with ready availability.

In U.S. Pat. No. 8,245,719 a walker with two wheels and two fixed feet has a removable combined seat and tray, but lacks a transport chair. Other such walkers attempting to address object carrying issues also lacking a transport chair are disclosed in U.S.P.P. 2008/0141911 and 2009/01200479.

Commercially available four wheeled walkers or rollators have various different design features which preclude use of a single removable utility tray and require unique tray support features for mounting. Accordingly, there is a need for a removable utility tray for a four wheeled walker or rollator having a foldable transport chair as in the Dolomite LEGACY VALO™ rollator or the D-LITE™ rollator Model 750NB. As employed herein the phrase “wheeled walker” includes a four-wheeled walker or rollator.

SUMMARY OF THE INVENTION

These and other advantages are provided in a wheeled walker having a removable utility tray comprising:

(a) a walker frame having (i) a pair of front wheels rotatably mounted at lower ends of a pair of upwardly extending front leg members;

(ii) a pair of rear wheels rotatably mounted at lower ends of upwardly extending rear leg members;

(iii) a horizontal seating surface pivotally mounted at upper ends of said rear leg members, said seating surface pivotable between a first horizontal position for accepting a rearward facing seated user and a second vertical position to provide an enhanced walking space for a user;

(iv) a pair of height adjustable handle bar members projecting upwardly and rearwardly of said front leg members;

(v) a pair of push handle assemblies, each disposed at an upper end of one of said handle bar members;

(vi) a generally arcuate-shaped back rest, disposed transversely between the upper ends of said push handle assemblies, said push handle assemblies slideably received for telescopic movement at one end with the ends of the back rest and at the other end with the upper ends of the handle bar members;

(vii) means for actuating a brake on the rear wheel including (vii-a) a brake housing, (vii-b) a rearwardly projecting brake handle mounted on said brake housing and pivotable between a neutral position and a brake locking position, and (vii-c) a brake cable connected at an upper end to said brake handle and at a lower end to a rear wheel lock, wherein in the brake locking position the brake cable engages the rear wheel lock;

(viii) a first crossbar member extending transversely between the front leg members adjacent a front edge of said seating surface; and (ix) a second crossbar member extending transversely between the lower ends of said front leg members; and (b) a removable generally drawer-shaped utility tray detachably mounted on said first and second crossbar members comprising (b-i) a tray base with a downwardly extending lip for engaging said first crossbar member, said lip spaced between said front leg members, (b-ii) a front wall, (b-iii) a pair of side wall members extending from the front wall rearwardly toward the forward end of the horizontal seating surface, and (b-iv) a tray support assembly which comprises (b-iv-a) a pair of parallel tray supports, each, at an upper end, extending downwardly and rearwardly from a bottom surface of said tray base, said tray supports terminating at a lower end at the second crossbar member, said lower ends of said tray supports having a locking groove for engaging said second crossbar member, wherein said lip and said locking grooves engage said first and second cross bar members, respectively, and restrain the utility tray against front to back and side to side movement, and (b-iv-b) a pair of horizontal braces extending between the tray supports.

The tray has a hole in the front wall aligned with a broom clip mounted on the top surface of the base. A perforated platform is affixed to the top of the front wall and the top of one side wall over a corner of the tray to accommodate a cup or bottle. A drain hole is provided in the base to permit liquid present in the tray to drain.

DESCRIPTION OF THE PREFERRED EMBODIMENTS

Figure 1:
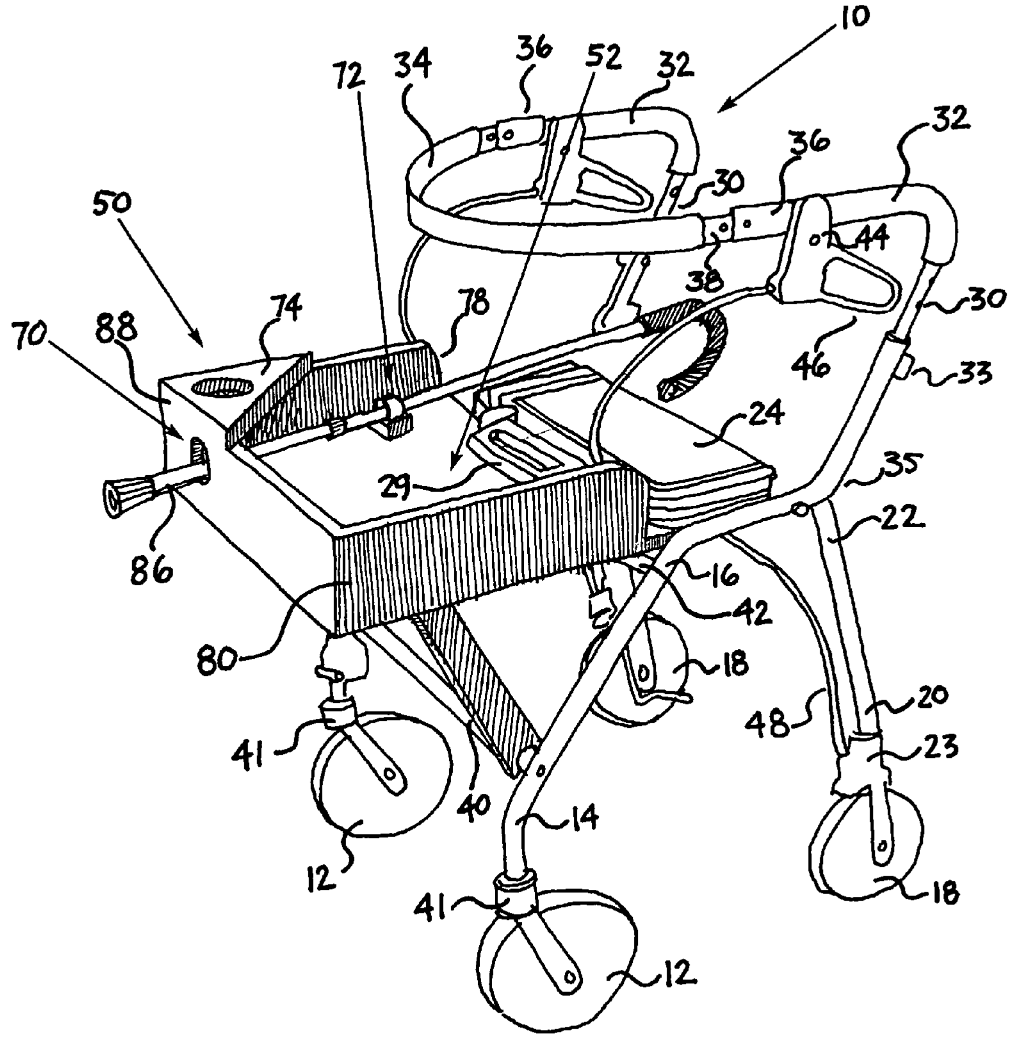
FIG. 1 is a front left perspective view of the inventive walker/transport chair with the removable tray.
Figure 2:
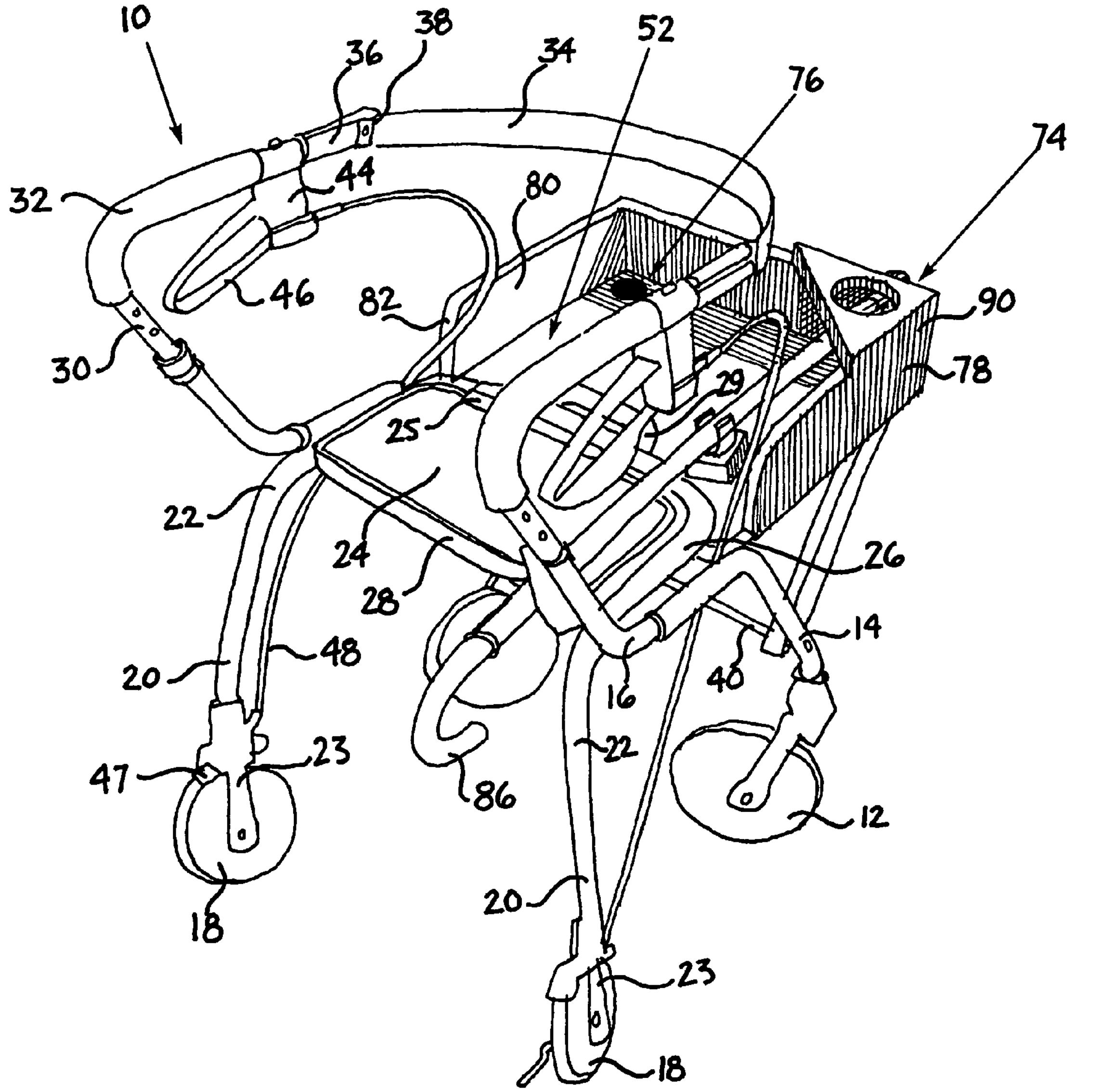
FIG. 2 is a rear right perspective view of the inventive walker/transport chair with the removable tray.

Referring to FIGS. 1 and 2 there is illustrated a perspective view of walker/transport chair frame 10 with removable utility tray 50 in a walker configuration. Frame 10 has a pair of front wheels 12 connected to the lower ends 14 of front leg members 16. A pair of rear wheels 18 are connected to the lower ends 20 of rear leg members 22.

Figure 8:
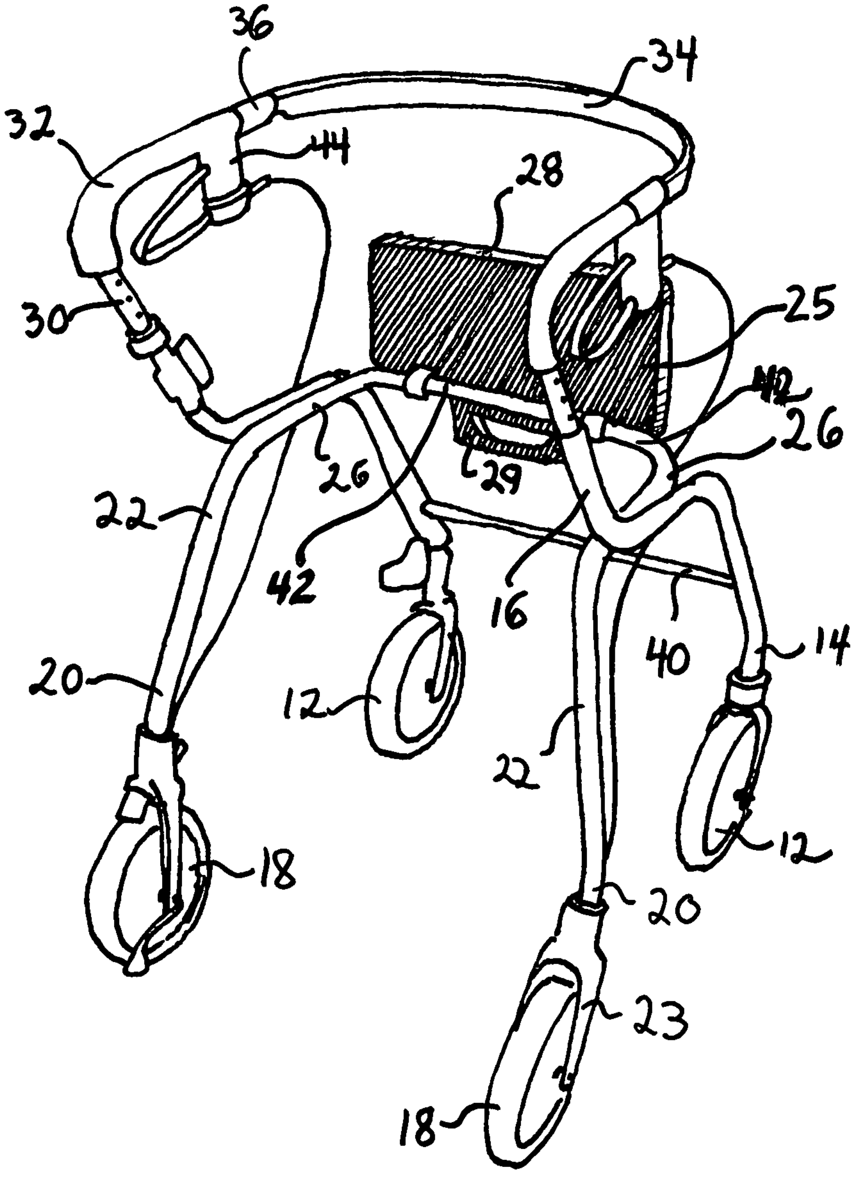
FIG. 8 is a rear right perspective view of the walker with the transport chair in a vertical position.

Seat 24 is horizontally supported at its first edge 25 by the transverse upper end 26 of the rear leg members 22 and provides a stable seating platform. Seat 24 is pivotally attached to transverse upper end 26 of rear leg members 22 such that it can be flipped via seat handle 29 to a vertical position by pulling up on seat rear edge 28 as shown in FIG. 8.

Front leg members 16 are stabilized by first crossbar member 40 which extends horizontally between front leg members 16 and is fixedly secured to the terminal ends of the front leg members by end fittings 41. Rear wheels 18 are carried by rear fork assemblies 23 which are fixedly connected to lower ends 20 of rear leg members 22.

Push handle assemblies 32 are fixedly attached to the upper ends of telescopic handle bar tubes 30 which are slideably received in front leg members 16 for adjusting the height of push handle assemblies 32. Thumb screws 33 are selectively inserted to fix telescopic handle bar tubes 30 at the desired height.

Front leg members 16 are pivotally attached to rear leg members 22 by pivot pins 35 to permit the front leg members to be folded toward the rear leg members to collapse the walker/transport chair into a compact configuration for easy transportation and storage.

Push handle assemblies 32 include attached brake housings 44 with brake handles 46. Brake handles 46 are operatively connected to brake shoes 47 by length-adjustable brake cables 48. Movement of brake handles 46 causes brake shoes 47 to engage rear wheels 18 to arrest movement. The brake system preferably employs conventional length-adjustable Bowden brake cables. Since brake cables 48 are preferably flexible they can be installed with excess length in a free-standing loop or bight to permit changes in length by adjustment of handle bar height. In use, the brake is released to free the walker by pulling up and releasing brake handle 46. Similarly, a constant braking force can be applied by pushing brake handle 46 down into a locked or "parked" position.

The walker frame 10 is generally made of a strong, durable natural or synthetic material which is readily sanitized and which has no sharp edges or rust concerns, such as a structural plastic composite or, preferably, aluminum.

Utility tray apparatus 50 is also made of a strong, durable material free from sharp edges and rust concerns which is readily sanitized, such as wood, a coated wood, a rust-resistant coated metal or an extruded or molded plastic. If made in pieces, the tray can be assembled with nails, screws, bolts and/or glue.

As shown in FIGS. 3-7 the utility tray apparatus 50 is generally drawer-shaped and includes a base 52, a lip or flange 54 which acts as a locking edge, a front wall 56, a pair of side walls 58 and a support bracket assembly 60.

Figure 3:
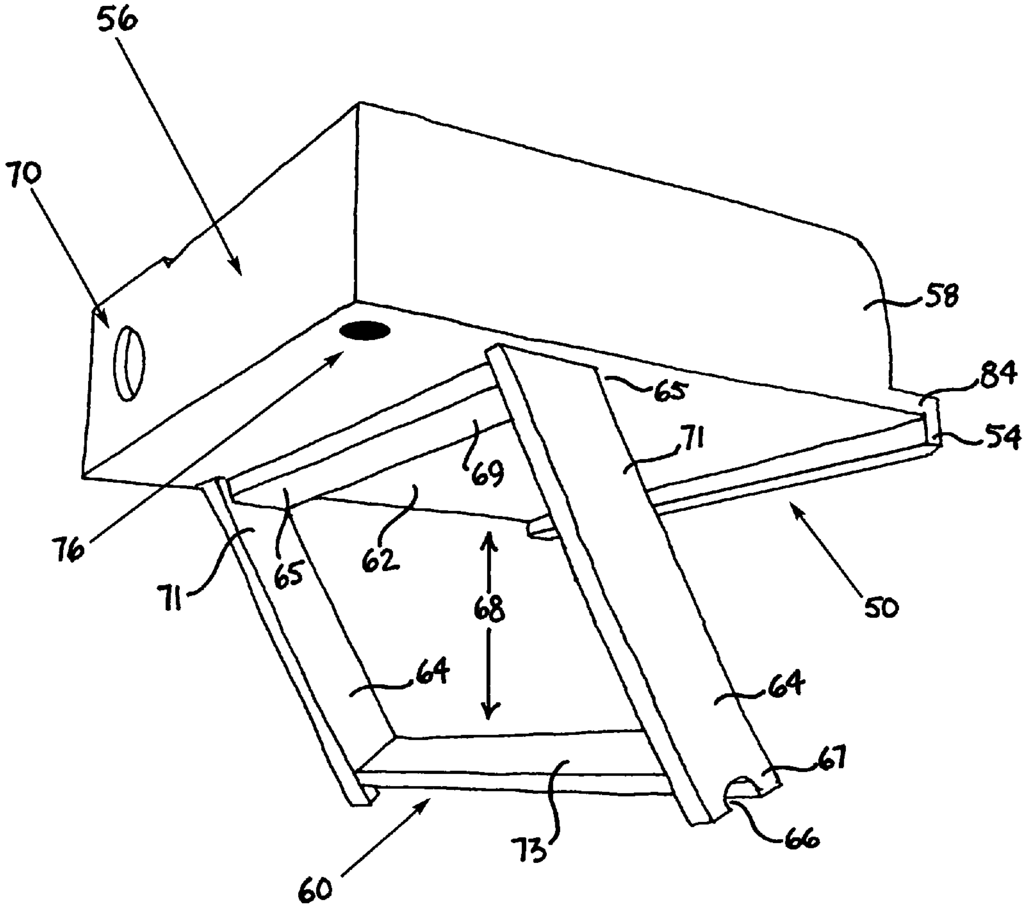
FIG. 3 is a front left perspective view of the removable tray of the invention.
Figure 5:
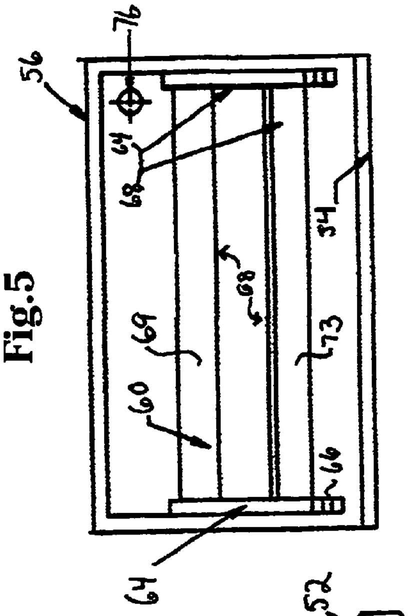
FIG. 5 is a bottom plan view of the removable tray of the invention.
Figure 6:
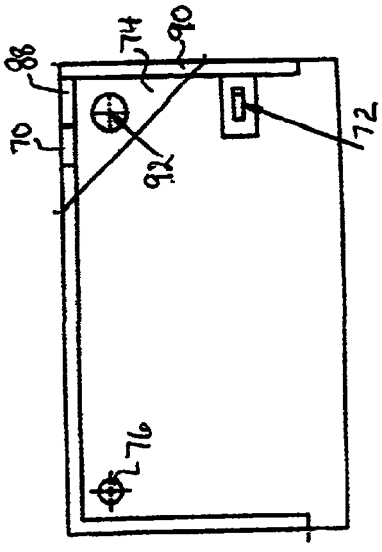
FIG. 6 is a top plan view of the removable tray of the invention.
Figure 7:
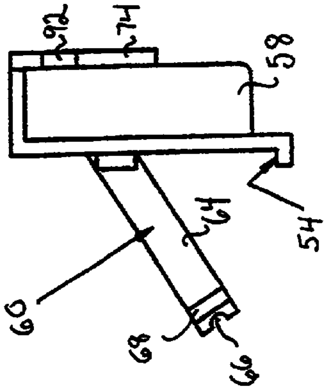
FIG. 7 is a left side sectional view of the removable tray of the invention.

As shown in FIGS. 3, 5 and 7 support bracket assembly 60 is mounted to a bottom external surface 62 of the tray apparatus. The support bracket assembly 60 includes a pair of vertically disposed supporting members 64 mounted at their upper ends 65 at opposite sides of the bottom surface 62 of the tray, wherein each supporting member 64 extending rearwardly and downwardly toward the first crossbar member 40 of the walker. At the lower end 67 of each supporting member 64 a groove 66 is present which is adapted to lockingly engage annular crossbar 40 to stabilize tray 50 against movement.

To stabilize support members 64, a pair of generally horizontally disposed braces 68 are provided. An upper brace 69 is disposed to engage the upper ends 71 of support members 64 and a lower brace 73 is disposed to engage the lower ends 67 of supporting members 64. The upper brace 69 is attached to the bottom surface 62 of the tray and to the upper ends 71 of the support members by appropriate anchoring means, such as screws, bolts and/or adhesives. The lower brace 73 is similarly affixed to lower ends 67 of supporting members 64.

Figure 4:
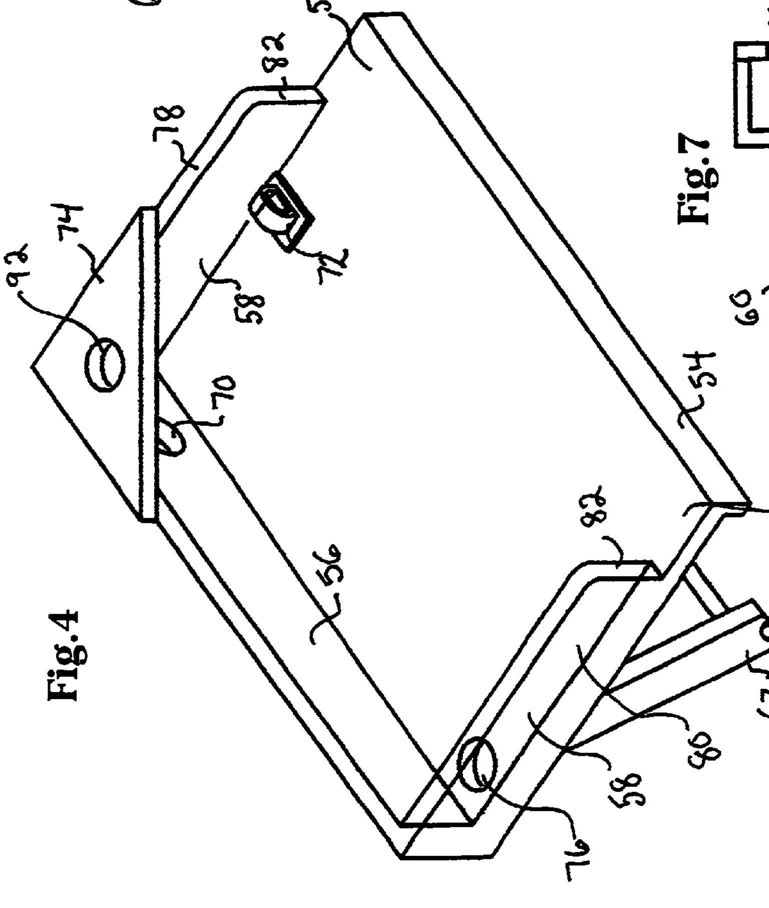
FIG. 4 is a rear left perspective view of the removable tray of the invention.

As shown in FIGS. 1, 2 and 4 right side section 78 and left side section 80 of tray 50 have terminal ends 82 forward of seat front edge 25. The terminal ends 82 of tray 50 slip beneath seat handle 29 when the seat is down.

As shown in FIGS. 1, 3 and 4 lip 54 extends downwardly from tray bottom 52 from a rear section 84 of tray bottom 52. Tray bottom 52 extends to the rear beyond right side section 78 and left side section 80 of tray 50. Lip or flange 54 engages annular second crossbar member 42 to lock tray 50 against horizontal movement. In use lip 54 is positioned over second crossbar 42 and tray 50 is pushed down to seat the lip 54 over the annular crossbar 42. Seat handle 29 fits over rear section 84 of tray base 52 to lock the tray against vertical movement.

The tray includes a cane or umbrella support which utilizes hole 70 in tray front wall 56 as seen in FIGS. 1, 3 and 4. Broom clip 72 is mounted to an upper surface of tray base 52 at a rear section thereof. A cane 86, umbrella or the like is inserted into a split opening of broom clip 72 and through hole 70 to retain the cane when not in use.

A drain hole 76 as shown in FIGS. 2-4 and 6 permits liquids to exit tray base 52 in the event of a spill or the like.

As shown in FIGS. 1, 4, 6 and 7 a triangular perforated platform 74 is provided over a portion of right front section 88 and right side section 90 of the tray. Platform 74 has a hole 92 which serves as a beverage holder for stably retaining a water bottle, soda can and the like.

This invention is not to be limited except as set forth in the following claims.

What is claimed is:

1. A wheeled walker having a removable utility tray comprising:

(a) a walker frame having (i) a pair of front wheels rotatably mounted at lower ends of upwardly extending rear leg members;

(iii) a horizontal seating surface, having a seat handle pivotally mounted at upper ends of said rear leg members, said seating surface pivotable between a first horizontal position for accepting a rearward facing seated user and a second vertical position to provide an enhanced walking space for a user;

(iv) a pair of height adjustable handle bar members projecting upwardly and rearwardly of said front leg members;

(v) a pair of push handle assemblies, each disposed at an upper end of one of said handle bar members;

(vi) a generally arcuate-shaped back rest disposed transversely between the upper ends of said push handle assemblies, said push handle assemblies slideably received for telescopic movement;

(vii) means for actuating a brake on the rear wheel including, (vii-a) a brake housing, (vii-b) a rearwardly projecting brake handle mounted on said brake housing and pivotable between a neutral position and a brake locking position, and (vii-c) a brake cable connected at an upper end to said brake handle and at a lower end to a rear wheel lock, wherein in the braking position the brake cable engages the rear wheel lock;

(viii) a first crossbar member extending transversely between the front leg members adjacent a front edge of said seating surface; and (ix) a second crossbar member extending transversely between the lower ends of said front leg members; and (b) a removable generally drawer-shaped utility tray detachably mounted on said first and second crossbar members comprising (b-i) a tray base with a downwardly extending lip for engaging said first crossbar member, said lip spaced between said front leg members, (b-ii) a front wall, (b-iii) a pair of side wall members extending from the front wall rearwardly toward the forward end of the horizontal seating surface, and (b-iv) a tray support assembly which comprises (b-iv-a) a pair of parallel tray supports, each, at an upper end, extending downwardly and rearwardly from a bottom surface of said tray base, said tray supports terminating at a lower end of the second crossbar member, said lower ends of said tray supports having a locking groove for engaging said second crossbar member, wherein said lip and said locking grooves engage said first and second crossbar members, respectively, and restrain the utility tray against front-to-back and side-to-side movement, and (b-iv-b) a pair of horizontal braces extending between the tray supports, the seat handle is spaced over a rear section of the tray base to lock the utility tray against vertical movement.

2. The wheeled walker of claim 1, wherein the utility tray has a hole in the front wall aligned with a broom clip mounted on the base of the utility tray to support a cane retained by the broom clip and passing through the hole.

3. The wheeled walker of claim 1, wherein the utility tray has a perforated platform affixed to the top of the front wall and the top of a side wall member over a front corner of the utility tray to accommodate a cup or bottle.

* * * * *